Sept. 9, 1930. A. BAER 1,775,581
ROTARY VALVE FOR INTERNAL COMBUSTION ENGINES
Filed Aug. 14, 1929 2 Sheets-Sheet 2
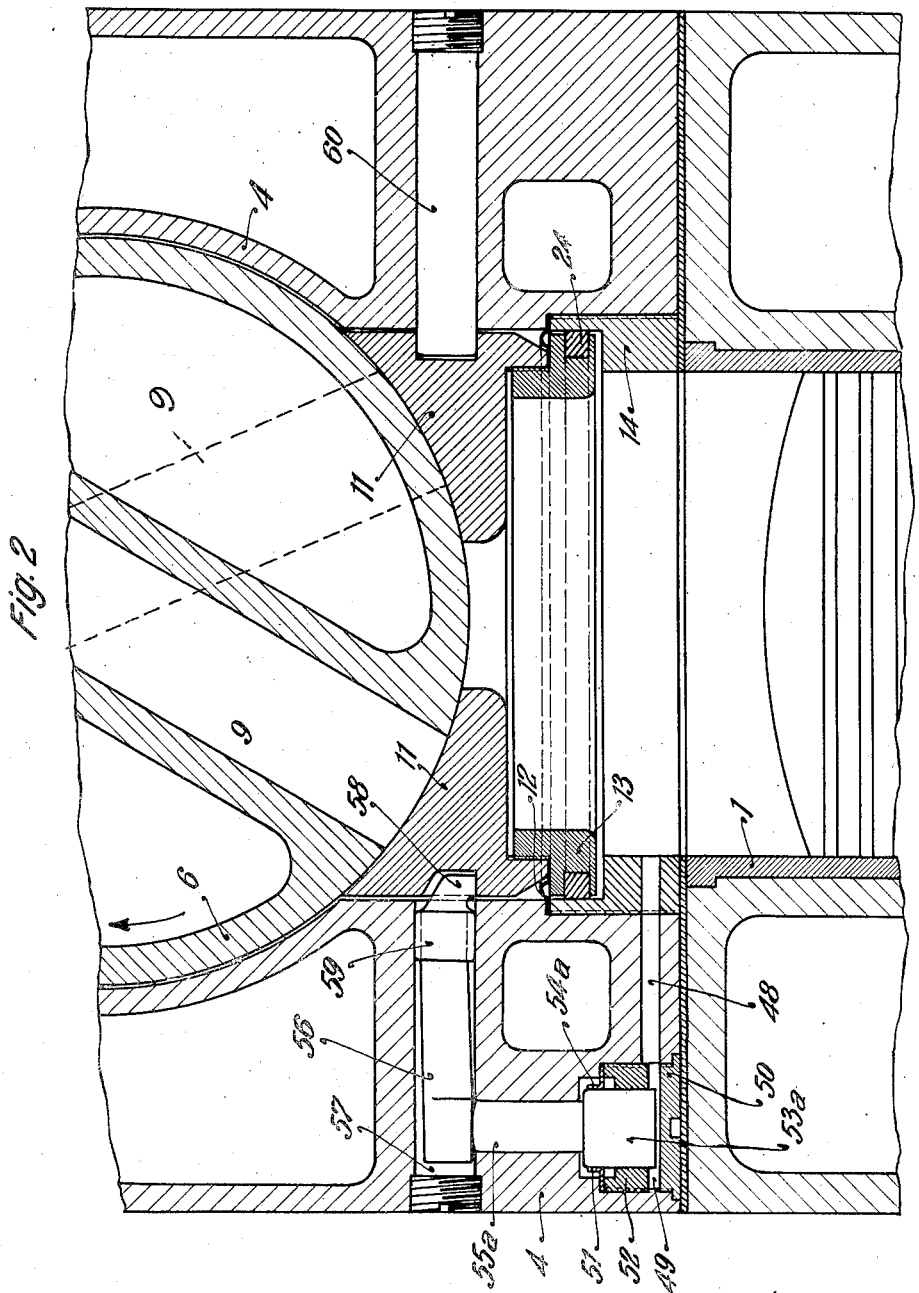

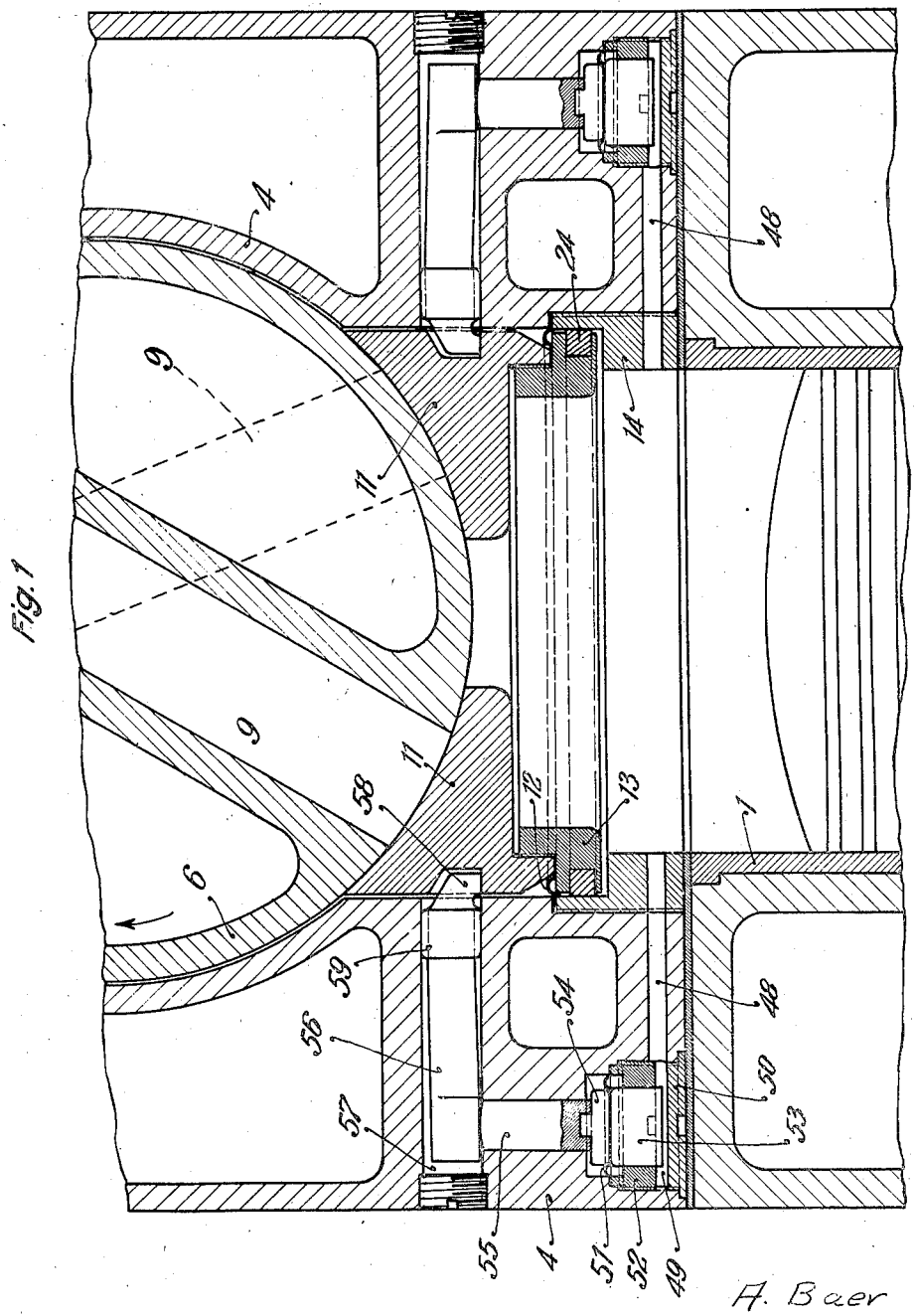

Patented Sept. 9, 1930

1,775,581

UNITED STATES PATENT OFFICE

ALFRED BAER, OF BERLIN-CHARLOTTENBURG, GERMANY

ROTARY VALVE FOR INTERNAL-COMBUSTION ENGINES

Application filed August 14, 1929, Serial No. 385,796, and in Germany July 10, 1928.

This invention is an improvement in the packing for rotary valves for internal combustion engines described in patent application Serial No. 306,640, filed Sept. 18, 1928.
In the arrangement according to the above application a reliable sealing between the rotary valve mounted in the cylinder head and the packing shoe located between it and the cylinder is obtained by the provision of a resilient packing ring between the two, the force due to the pressure of which is sufficient for keeping the packing shoe pressed against the rotary valve. To this constantly acting pressure of the packing ring there is added during the compression and explosion stroke a further considerably stronger pressure which is exerted by the compressed and ignited mixture directly on the under side of the packing shoe and which results in a strong braking action of the rotary valve and consequently a correspondingly great loss of power.

The object of the present invention is to overcome this drawback and is realized by the packing shoe which seals the rotary valve being automatically relieved of the pressure of the compressed or ignited gas and air mixture exerted on it during the compression and explosion stroke. According to the invention this relief is effected by a portion of the pressure medium being deflected from its main direction and being caused to act in the opposite direction on the packing shoe, this being effected by a mechanical auxiliary device consisting of a number of levers which have arms of unequal length and each of which is controlled by a diaphragm influenced by the deflected portion of the pressure medium.

As experience has shown, it is with such an arrangement not absolutely necessary to arrange this pressure-relieving device equally on both sides of the packing shoe. It is sufficient to provide it only on the side opposed to the direction of rotation of the rotary valve, while on the opposite side it is only necessary to provide a locking bolt which secures the packing shoe from moving in the direction of rotation. This arrangement of course constitutes a considerable simplification of the device.

Two constructional forms of the invention are shown by way of example in the accompanying drawings:

Figure 1 is a longitudinal section through the power cylinder with two relieving devices for the packing shoe. Figure 2 is a longitudinal section through the power cylinder with only one relieving device for the packing shoe which is held by a locking bolt on the side opposite the relieving device.

The arrangement according to Fig. 1 corresponds in its essential parts to that of application Serial No. 306,640. In this improved constructional form as well the rotary valve 6 is journalled in a casing 4 forming the cylinder head and is provided with two passages 9 offset with respect to one another through 52°, for the admission of the fresh mixture and the exhaust of the waste gases. Between the power cylinder 1 and the rotary valve 6 is the slidable packing shoe 11 which is sealed by the sealing ring 12, the inner flanged part of which is fixed by means of the clamping ring 13 in a gas-tight manner to the packing shoe 11, while the outer flanged part of the sealing ring 12 is clamped by the pressure ring 14 between the latter and a shoulder of the cylinder head 4. By means of a packing ring 24 in the clamping ring 13 the admission of hot explosion gases to the sealing ring 12 is prevented in a reliable manner. In order that the packing shoe 11 shall be relieved during the compression and explosion stroke of the pressure of the compressed or ignited mixture acting on it, the following arrangement is provided.

The pressure ring 14 and the portion of the cylinder head 4 embracing it is provided on the side opposed to the direction of rotation of the rotary valve with lateral bores 48, each of which leads to a bore 49 in the cylinder head 4. These bores are closed at their lower opening by a screw cap 50 and at the top by an easily vibrating diaphragm 51, the edge of which rests on a shoulder in the bore and is pressed by a pressure ring 52 provided with an external thread firmly against the said shoulder. In the inner smooth bore of the pressure ring 52 a solid disc 53 is slidably inserted, such that it rests with its closed end directly against the lower side of the diaphragm 51. On the upper side of the diaphragm 51 rests the foot 54 of a bolt-shaped sliding bar 55 which slides in a vertical bore in the cylinder head 4 and the upper end of which acts against the unsupported end of a two-armed lever 56. Each of these levers 56 is inserted in a horizontal bore 57 of the cylinder head 4, so as to be freely movable therein, and engages with its forward considerably shorter lever arm 58 in a corresponding recess of the packing shoe 11. The fulcrum of this two-armed lever 56, 58 is formed by a rounded collar 59 which is slipped on to the forward lever end and is adjustable, to enable the ratio of the lengths of the lever arms to be varied as required.

The arrangement acts in such a manner that both during the compression and during the explosion stroke a portion of the pressure medium, that is to say the compressed or ignited gas and air mixture, is led away through the bores 48 laterally out of the hollow space within the cylinder and is conveyed to the bores 49, where it acts on the lower side of the pressure disc 53 and consequently on the lower side of the resilient diaphragm 51. The diaphragms are consequently forced upwards causing the bolts 55 to slide upwards, which themselves produce a tilting motion of the two-armed levers 56, 58 about their fulcrum 59. Through this tilting motion the packing shoe 11 is forced downwards by a very small amount, so that the upward motion imparted to it by the additional compression and explosion pressure is compensated. Consequently there can no longer be any braking of the motion of the rotary valve through this additional pressure on the packing shoe.

The adjustability of the lever fulcrum 59 has the advantage that, should there be any changes in the pressure conditions within the power cylinder 1, the ratio of the lengths of the lever arms can be correspondingly altered, in order in any case to be able to oppose to the additional compression and explosion pressure on the packing shoe 11 an exactly equal counter pressure.

The constructional form shown in Fig. 2 differs from that according to Fig. 1 in this, that the automatic pressure-relieving device is provided only on that side which is opposed to the direction of rotation of the rotary valve, while on the opposite side the packing shoe is held only by a simple locking bolt 60, for securing it against any motion in the direction of rotation. The direction of rotation of the valve is indicated by the arrows in both figures.

The constructional form shown in Fig. 2 corresponds substantially to that shown in Fig. 1, but in it the pressure bolt is not composed of several parts but of a single part and consists of the head of greater diameter 53ª and the shank 55ª. The inner edge 54ª of the diaphragm 51, which is preferably beaded over upwards or downwards, is fixed in any suitable manner to the head 53ª of the bolt. The pressure bolt 53ª, 55ª coacts as in the constructional example according to Fig. 1, with a two-armed lever 56 which is inserted in one of the horizontal bores 57 of the cylinder head 4 so as to move freely therein, and with its forward considerably shorter lever arm 58 engages in a corresponding recess in the movable cylinder end 11. The fulcrum of the lever 56 is provided by a slightly barrelled collar 59 mounted in the vicinity of the forward end of the lever. The arrangement just described acts in exactly the same way as the pressure-relieving device according to Fig. 1.

On the side of the rotary valve sealing device which is on the right hand in the drawing, that is on the side lying in the direction of motion of the rotary valve, such a pressure-relieving device is, as already stated, not provided. On this side the locking bolt 60 is slid into the bore 57, the forward end of which engages in a suitable depression in the packing shoe 11, limiting the upper motion of the latter. This provides not only an effective relief for the sealing diaphragm 12, but at the same time prevents the right hand side of the packing shoe being pressed against the peripheral surface of the rotary valve with excessive force during the compression and the explosion of the gas mixture.

What I claim is:

1. In an internal combustion engine having a rotary valve and a packing shoe bearing against the said rotary valve, means for automatically relieving the pressure acting on the packing shoe during the compression and the explosion stroke of the engine, as and for the purpose set forth.

2. In an internal combustion engine having a rotary valve and a packing shoe bearing against the said rotary valve, means for deflecting a portion of the pressure medium from its main direction and means for causing it to act on the packing shoe end in the opposite direction, for relieving the pressure acting on said packing shoe during the compression and the explosion stroke of the engine, as and for the purpose set forth.

3. In an internal combustion engine having a rotary valve and a packing shoe bearing against the said rotary valve, means for deflecting a portion of the pressure medium from its main direction and mechanical means capable of being acted on by the said deflected portion and of acting on the packing shoe, for relieving the pressure acting on said shoe during the compression and the explosion stroke of the engine, as and for the purpose set forth.

4. In an internal combustion engine having a rotary valve and a packing shoe bearing against the said rotary valve, means for deflecting a portion of the pressure medium from its main direction, a plurality of diaphragms capable of being acted on by the deflected portion of the pressure medium and a plurality of levers having arms of unequal length for transmitting the motion of the diaphragms to the packing shoe, for relieving the pressure acting on it during the compression and the explosion stroke of the engine, as and for the purpose set forth.

5. In an internal combustion engine having a rotary valve and a packing shoe bearing against the said rotary valve, a plurality of lateral bores in the cylinder head for deflecting a portion of the pressure medium from its main direction, a plurality of diaphragms capable of being acted on by a portion of the pressure medium so deflected and a plurality of levers having arms of unequal length for transmitting the motion of the diaphragms to the packing shoe, for relieving the pressure acting on it during the compression and the explosion stroke of the engine, as and for the purpose set forth.

6. In an internal combustion engine having a rotary valve and a packing shoe bearing against said rotary valve, a plurality of lateral bores in the cylinder head for deflecting a portion of the pressure medium from its main direction, a plurality of capped bores in the cylinder head, a diaphragm in each bore capable of being acted on by the portion of the pressure medium so deflected, a pressure ring in each bore for clamping the diaphragm so as to vibrate freely therein, a plurality of levers having arms of unequal length mounted so as to be capable of rocking in the cylinder head and of acting with their short arms on the packing shoe and a plurality of pins for transmitting the motion of the diaphragms to the long arms of the said levers, as and for the purpose set forth.

7. An arrangement as claimed in claim 4 and in which the lever arms bear such a ratio to one another that the pressure exerted by the short lever arms on the packing shoe equals the compression and explosion pressure acting directly on the packing shoe, as and for the purpose set forth.

8. An arrangement as claimed in claim 4 and in which the levers are adjustable, for enabling the action of the levers to be adapted to the pressure conditions, as set forth.

9. In an internal combustion engine having a rotary valve and a packing shoe bearing against said rotary valve, a plurality of lateral bores in the cylinder head for deflecting a portion of the pressure medium from its main direction, a plurality of capped bores in the cylinder head, a diaphragm in each bore, a pressure ring in each bore, for clamping the diaphragm so as to be capable of vibrating freely therein, a pressure disc slidable in each pressure ring and capable of being acted on by the deflected portion of the pressure medium and a plurality of levers having arms of unequal length for transmitting the motion of the diaphragms to the packing shoe end, as and for the purpose set forth.

10. In an internal combustion engine having a rotary valve and a packing shoe bearing against the said rotary valve, mechanical means at one side of the packing shoe for automatically relieving the pressure acting on the packing shoe during the compression and explosion stroke of the engine and a locking bolt on the diametrically opposite side of the packing shoe for securing the latter in its working position, as and for the purpose set forth.

11. In an internal combustion engine having a rotary valve and a packing shoe bearing against the said rotary valve, mechanical means on the side of the movable cylinder end opposed to the direction of rotation of the rotary valve for automatically relieving the pressure acting on the packing shoe during the compression and explosion stroke of the engine and a locking bolt on the diametrically opposite side of the packing shoe for securing the latter in its working position, as and for the purpose set forth.

12. In an internal combustion engine having a rotary valve and a packing shoe bearing against the said rotary valve means for deflecting a portion of the pressure medium from its main direction, a lever having arms of unequal length capable of rocking in the cylinder head and having its short arm bearing against the packing shoe and a plunger capable of sliding in the cylinder head, having one end exposed to the deflected portion of the pressure medium and its other end bearing against the long arm of the lever for transmitting the pressure of the deflected portion of the pressure medium to the packing shoe for relieving the pressure acting on the latter during the compression and explosion stroke of the engine, as and for the purpose set forth.

13. In an internal combustion engine having a rotary valve and a packing shoe bearing against the said rotary valve, mechanical means at one side of the movable cylinder end for automatically relieving the pressure acting on the packing shoe during the compression and explosion stroke of the engine, a locking bolt on the diametrically opposite side of the packing shoe for securing the latter in its working position, a lateral bore in the cylinder head for the said locking bolt and a recess in the packing shoe for the front end of the said locking bolt, as and for the purpose set forth.

In testimony whereof I have signed my name to this specification.

ALFRED BAER.